United States Patent
Adachi et al.

(10) Patent No.: US 9,789,393 B2
(45) Date of Patent: Oct. 17, 2017

(54) MOTION SENSOR, OBJECT-MOTION DETECTION METHOD, AND GAME MACHINE

(71) Applicant: OMRON Corporation, Kyoto-shi, Kyoto (JP)

(72) Inventors: Tatsuya Adachi, Aichi (JP); Masashi Sato, Aichi (JP); Mitsunori Sugiura, Aichi (JP)

(73) Assignee: OMRON Corporation, Kyoto (JP)

( * ) Notice: Subject to any disclaimer, the term of this patent is extended or adjusted under 35 U.S.C. 154(b) by 248 days.

(21) Appl. No.: 14/404,900

(22) PCT Filed: Jun. 14, 2013

(86) PCT No.: PCT/JP2013/066498
§ 371 (c)(1),
(2) Date: Dec. 1, 2014

(87) PCT Pub. No.: WO2014/002803
PCT Pub. Date: Jan. 3, 2014

(65) Prior Publication Data
US 2015/0157931 A1    Jun. 11, 2015

(30) Foreign Application Priority Data

Jun. 25, 2012  (JP) ................................ 2012-142257
Jun. 25, 2012  (JP) ................................ 2012-142274

(51) Int. Cl.
*G06K 9/00*    (2006.01)
*A63F 13/213*  (2014.01)
(Continued)

(52) U.S. Cl.
CPC ............ *A63F 13/213* (2014.09); *G06F 3/017* (2013.01); *G06K 9/00355* (2013.01);
(Continued)

(58) Field of Classification Search
None
See application file for complete search history.

(56) References Cited

U.S. PATENT DOCUMENTS 8,130,306 B2 *  3/2012  Kitaura ................. G09G 5/397
                                              348/155
8,146,020 B2 *  3/2012  Clarkson ................ G06F 3/017
                                              382/103
(Continued)

FOREIGN PATENT DOCUMENTS

JP   H09-179988 A    7/1997
JP   2001-246161 A   9/2001
(Continued)

OTHER PUBLICATIONS

International Search Report issued in PCT/JP2013/066498, mailed on Aug. 13, 2013 (6 pages).
(Continued)

*Primary Examiner* — Soo Park
(74) *Attorney, Agent, or Firm* — Osha Liang LLP

(57) ABSTRACT

An object-motion detection method includes extracting, from each of a first image representing a detection-target object and generated by an imaging unit and a second image representing the detection-target object and generated after the first image by the imaging unit, an object area including the detection-target object, obtaining, for each of the first image and the second image, a reference point indicating a boundary between a moving part of the detection-target object and a fixed part of the detection-target object, the moving part moving when the detection-target object performs a certain motion, the fixed part not moving compared to the moving part when the detection-target object performs the certain motion, and obtaining, for each of the first image and the second image, a position of the moving part of the
(Continued)

object area in a first area locating on a side including the moving part with respect to the reference point.

6 Claims, 9 Drawing Sheets

(51) Int. Cl.
  *G06F 3/01* (2006.01)
  *G07F 17/32* (2006.01)
  *G06T 7/215* (2017.01)
(52) U.S. Cl.
  CPC .......... *G06T 7/215* (2017.01); *G07F 17/3206* (2013.01); *G07F 17/3209* (2013.01)

(56) References Cited

U.S. PATENT DOCUMENTS

| | | | |
|---|---|---|---|
| 9,128,526 B2* | 9/2015 | Homma | G06F 3/017 |
| 9,165,181 B2* | 10/2015 | Maeda | G06K 9/00228 |
| 2007/0132725 A1 | 6/2007 | Kitaura | |
| 2009/0027337 A1* | 1/2009 | Hildreth | G06F 3/011 345/158 |
| 2013/0069867 A1* | 3/2013 | Watanabe | G06F 3/017 345/156 |

FOREIGN PATENT DOCUMENTS

| | | |
|---|---|---|
| JP | 2006-099749 A | 4/2006 |
| JP | 2006-259899 A | 9/2006 |
| JP | 2007-189664 A | 7/2007 |
| JP | 2011-193937 A | 10/2011 |

OTHER PUBLICATIONS

Written Opinion issued in PCT/JP2013/066498, mailed on Aug. 13, 2013 (3 pages).

* cited by examiner

MOTION SENSOR, OBJECT-MOTION DETECTION METHOD, AND GAME MACHINE

BACKGROUND

Field

The present invention relates to a motion sensor and an object-motion detection method for detecting motion of a certain object by analyzing images of the object, and a game machine including the motion sensor.

Related Art

Equipping a game machine such as slot game machine and pinball game machine with a motion sensor for detecting motion of an object such as a hand of a game player has been studied, in order that the player can intuitively understand the relationship between an operation by the player and presentation (see Japanese Laid-open Patent Publication No. 2011-193937, for example).

As such a motion sensor, motion sensors using images obtained by capturing a detection-target object are known. For example, Japanese Laid-open Patent Publication No. 2011-193937 discloses that motion of a detection-target object is detected by analyzing each of images of the detection-target object captured at predetermined time intervals and then identifying a motion vector of the object.

SUMMARY

Such motion sensors using images as that described above have an advantage that the sensors need not be attached to the detection-target object. However, in some cases, even when the detection-target object performs a motion which should be detected, part of the object does not move much during the motion. For example, when the detection-target object rotationally moves around a rotation axis positioned as part of the object, the position of the object does not change much near the rotation axis. When the part which does not move much is included in the images, a motion sensor using the images determines whether or not the object has performed the motion, by referring to the area also including the part not moving much. For this reason, such a motion sensor has a possibility of not being able to detect the certain motion even when the object is performing the motion.

One or more embodiments of the present invention provides a motion sensor and an object-motion detection method which can detect that, even when part of a detection-target object does not move much while performing a certain motion, the motion has been performed.

A motion sensor according to one or more embodiments of the present invention includes: an object-area extraction unit which extracts, from each of a first image representing a detection-target object and generated by the imaging unit and a second image representing the detection-target object and generated after the first image by the imaging unit, an object area including the detection-target object; a reference-point identification unit which obtains, for each of the first image and the second image, a reference point indicating a boundary between a moving part of the detection-target object and a fixed part of the detection-target object, the moving part moving when the detection-target object performs a certain motion, the fixed part not moving compared to the moving part when the detection-target object performs the certain motion; a moving-part position detection unit which obtains, for each of the first image and the second image, position of the moving part of the object area in a first area locating on a side including the moving part with respect to the reference point; and a determination unit which determines that the certain motion has been performed, when difference between the position of the moving part in the first image and the position of the moving part in the second image corresponds to a movement of the detection-target object during the certain motion.

In this motion sensor, according to one or more embodiments of the present invention, the moving-part position detection unit divides the first area into a plurality of partial areas along a direction in which the moving part moves when the detection-target object performs the certain motion, and determines a center of one or more of the plurality of partial areas which overlap with the object area as the position of the moving part.

Alternatively, in this motion sensor, according to one or more embodiments of the present invention, the determination unit determines that the certain motion has been performed, when the reference point is locating between the position of the moving part in the first image and the position of the moving part in the second image along the direction in which the detection-target object moves during the certain motion.

A object-motion detection method according to one or more embodiments of the present invention includes: extracting, from each of a first image representing a detection-target object and generated by the imaging unit and a second image representing the detection-target object generated after the first image by the imaging unit, an object area including the detection-target object; obtaining, for each of the first image and the second image, a reference point indicating a boundary between a moving part of the detection-target object and a fixed part of the detection-target object, the moving part moving when the detection-target object performs a certain motion, the fixed part not moving compared to the moving part when the detection-target object performs the certain motion; obtaining, for each of the first image and the second image, position of the moving part of the object area in a first area locating on a side including the moving part with respect to the reference point; and determining that the certain motion has been performed, when difference between the position of the moving part in the first image and the position of the moving part in the second image corresponds to a movement of the detection-target object during the certain motion.

A game machine according to one or more embodiments of the present invention includes: a game machine main body; an imaging unit which captures images of a certain range on a front face of the game machine main body at predetermined capturing intervals, and generates an image including the certain range every time capturing; a motion sensor which detects a certain motion of a detection-target object locating in the certain range, by using the images; a control unit which determines a content of presentation according to timing of detecting the certain motion of the detection-target object; and a display unit which displays an image corresponding to the content of presentation. In this game machine, the motion sensor includes: an object-area extraction unit which extracts, from each of a first image representing the detection-target object and generated by the imaging unit and a second image representing the detection-target object and generated after the first image by the imaging unit, an object area including the detection-target object; a reference-point identification unit which obtains, for each of the first image and the second image, a reference point indicating a boundary between a moving part of the detection-target object and a fixed part of the detection-target object, the moving part moving when the detection-target object performs the certain motion, the fixed part not moving compared to the moving part when the detection-target object performs the certain motion; a moving-part position detection unit which obtains, for each of the first image and the second image, position of the moving part of the object area in a first area locating on a side including the moving part with respect to the reference point; and a determination unit which determines that the certain motion has been performed, when difference between the position of the moving part in the first image and the position of the moving part in the second image corresponds to a movement of the detection-target object during the certain motion.

The motion sensor, the object-motion detection method, and the game machine according to one or more embodiments of the present invention can detect that, even when part of a detection-target object does not move much while performing a certain motion, the motion has been performed.

DETAILED DESCRIPTION

In the following, with reference to the drawings, embodiments of the present invention will be described. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. For example, a motion sensor according to embodiments of the present invention and an object-motion detection method according to one or more embodiments of the present invention, performed by the motion sensor, will be described. The motion sensor, for example, sequentially receives images generated at predetermined imaging intervals by an imaging unit which captures a predetermined area, and extracts an object area, which is an area including the detection-target object, from each of the received images. The motion sensor identifies a reference point indicating the boundary between a moving part and a fixed part of the detection-target object on the basis of the object area in each of the images. The moving part is a part of the detection-target object which moves while the detection-target object is performing a certain motion, on the other hand, the fixed part is a part of the detection-target object which does not move much compared to the moving part during the motion. The motion sensor finds the position of the moving part in the area on the moving-part side of the reference point. Then, the motion sensor determines that the detection-target object has performed the certain motion, when the difference in position of the moving part between a plurality of images captured at different time points corresponds to a movement of the detection-target object in the certain motion.

In one or more embodiments of the present invention, the detection-target object is a hand, and the certain motion is the motion of swinging a hand with the fixed wrist.

Figure 1:
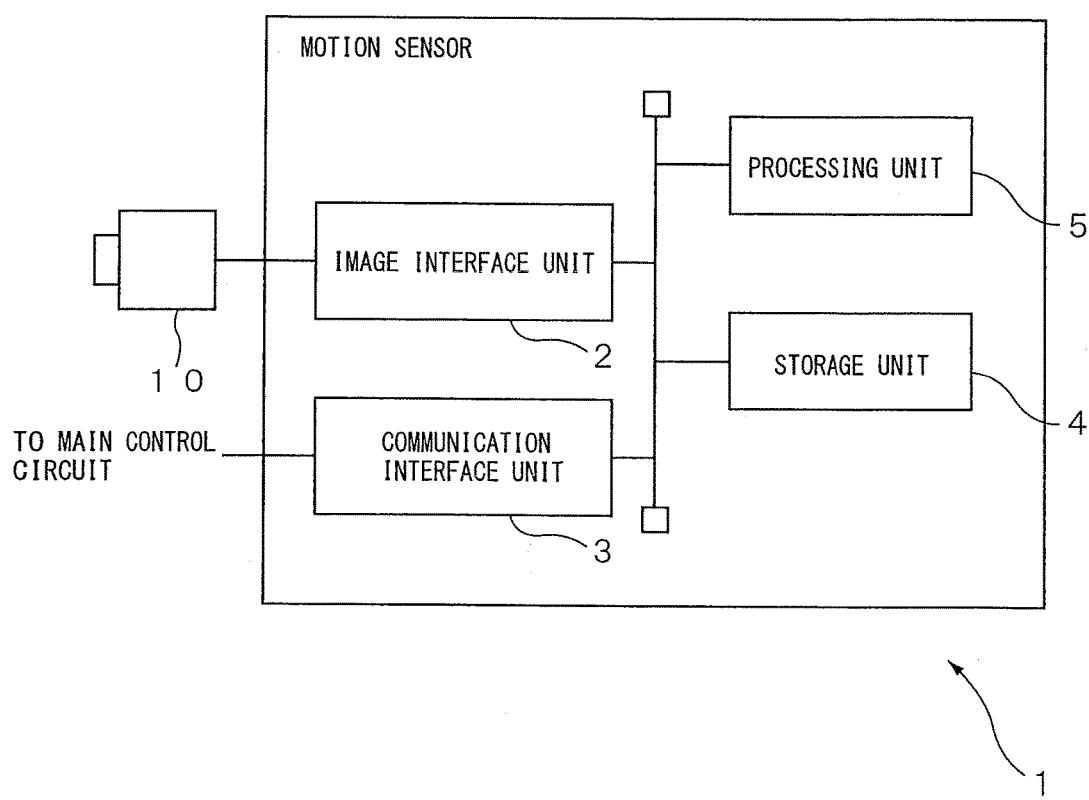
FIG. 1 is a schematic configuration diagram of a motion sensor according to one or more embodiments of the present invention.

FIG. 1 is a schematic configuration diagram of the motion sensor according to one or more embodiments of the present invention. A motion sensor 1 according to one or more embodiments of the present invention includes an image interface unit 2, a communication interface unit 3, a storage unit 4, and a processing unit 5. These units included in the motion sensor 1 are mounted on the motion sensor 1, as a single integrated circuit, for example. Alternatively, respective units may be mounted individually as separate circuits on a circuit board.

The image interface unit 2 is an interface circuit for connecting the motion sensor 1 with an imaging unit 10, and receives, every time the imaging unit 10 generates an image, the image from the imaging unit 10. Then, the image interface unit 2 passes the received image to the processing unit 5.

The imaging unit 10 is, for example, an infrared camera, which is sensitive to infrared rays, and is disposed so that the detection-target object would be positioned in the capturing range of the imaging unit 10. The imaging unit 10 takes images of the capturing range at predetermined capturing intervals, and thereby generates images of the capturing range at the capturing intervals. In addition, every time generating an image, the imaging unit 10 outputs the generated image to the motion sensor 1. The capturing interval is 33 msec, for example.

The communication interface unit 3 includes an interface circuit for connecting a main control circuit of a game machine (not illustrated) with the motion sensor 1, for example. When the communication interface unit 3 receives a control signal for starting a process of detecting the certain motion of the detection-target object from the main control circuit, the communication interface unit 3 passes the control signal to the processing unit 5. In addition, upon receipt of a signal indicating that the certain motion performed by the detection-target object has been detected, from the processing unit 5, the communication interface 3 outputs the signal to the main control circuit.

The storage unit 4 includes a readable/writable nonvolatile semiconductor memory and a readable/writable volatile semiconductor memory, for example. The storage unit 4 temporarily stores the images received from the imaging unit 10 for a time period used by the processing unit 5 to perform the object-motion detection process. In addition, the storage unit 4 may store various data to be used in the object-motion detection process, for example, flags each indicating a detected move direction of the detection-target object, various interim calculation results obtained while the object-motion detection process is being performed, and the like.

The processing unit 5 includes one or more processors and their peripheral circuitry. The processing unit 5 determines whether or not a hand, which is an example of the detection-target object, has performed the motion of swinging the hand, which is an example of the certain motion, by analyzing the images received from the imaging unit 10.

Figure 2:
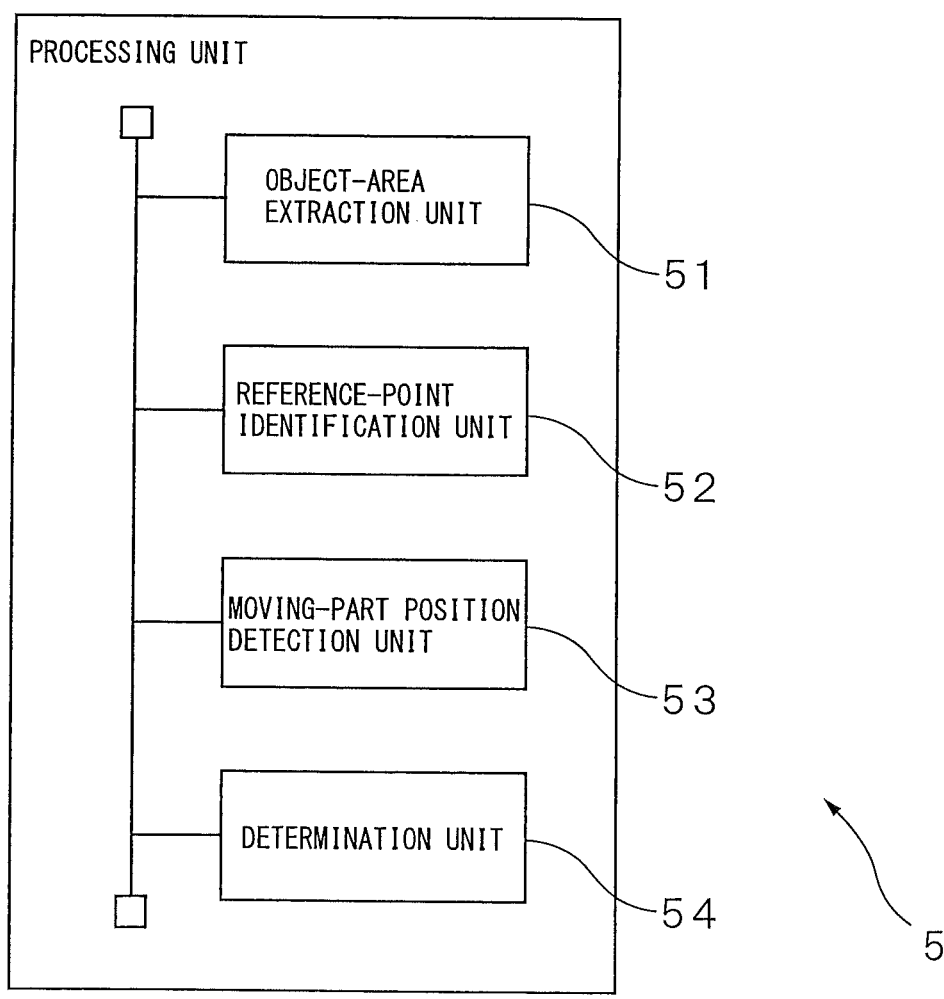
FIG. 2 is a functional block diagram illustrating functions performed by a processing unit.

FIG. 2 is a functional block diagram illustrating functions performed by the processing unit 5. As illustrated in FIG. 2, the processing unit 5 includes an object-area extraction unit 51, a reference-point identification unit 52, a moving-part position detection unit 53, and a determination unit 54.

Every time the processing unit 5 receives an image from the imaging unit 10, the object-area extraction unit 51 extracts an object area, which is an area including the detection-target object from the image.

Figure 3:
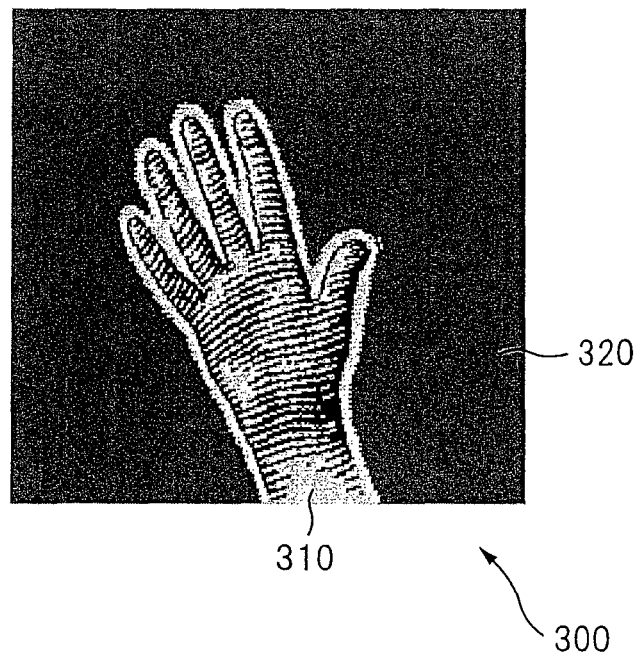
FIG. 3 is a schematic view of illustrating an image generated by an imaging unit.

FIG. 3 is a schematic view of an image generated by the imaging unit 10. In one or more embodiments of the present invention, since the imaging unit 10 is an infrared camera, the luminance of a part corresponding to a heat source existing in the capturing range is higher than that of the part not including the heat source. Accordingly, in an image 300, the luminance of an object area 310 including a hand of a game player is higher, i.e., shown whiter than that of a background area 320 not including the hand.

The object-area extraction unit 51 extracts pixels each having a higher luminance value than a predetermined luminance threshold value, from among the pixels of the image. Then, by performing labeling on the extracted pixels, the object-area extraction unit 51 finds the area including a group of extracted pixels adjacent to each other. When the number of pixels included in the area is larger than or equal to a real-size threshold value corresponding to the areal size of a hand assumed on the image, the object-area extraction unit 51 determines that the area is the object area.

The luminance threshold value may be set, for example, at the average value of the luminance values of the respective pixels of the image, or the minimum value of the luminance values of the respective pixels each including part of the hand.

The object-area extraction unit 51 generates, for each image, a binary image presenting the object area extracted from the image. The binary image is generated so that the value of each pixel included in the object area (e.g., "1") differs from the value of each pixel included in the background area (e.g., "0"). In the following, a binary image presenting an object area is referred to as an object area image, for convenience.

The object-area extraction unit 51 passes the object area image to the reference-point identification unit 52 and the moving-part position detection unit 53.

Every time the processing unit 5 receives an image from the imaging unit 10, the reference-point identification unit 52 obtains, on the basis of the object area in the object area image corresponding to the received image, a reference point indicating the boundary between a moving part of the detection-target object and a fixed part of the detection-target object. The moving part is a part which moves when the hand, which is the detection-target object, performs the certain motion, on the other hand, the fixed part is a part which does not moves much compared to the moving part when the hand performs the certain motion. In one or more embodiments of the present invention, since the certain motion is a motion of swinging a hand with the fixed wrist, the part on the palm side of the wrist corresponds to the moving part while the wrist and the part on the arm side of the wrist correspond to the fixed part.

In one or more embodiments of the present invention, the reference-point identification unit 52 identifies pixels including the wrist or the neighbor pixels in the image, as a reference point, on the basis of the outer form of the object area. When an image of a hand is to be captured, according to one or more embodiments of the present invention, the captured hand is large in the image to some extent. For this reason, the capturing range of the imaging unit 10 does certainly not include the entire human body. Hence, the object area including the hand is in contact with any of ends of the image, near the part including the wrist in the object area. In addition, the width of the palm is larger than that of the wrist.

In view of these, first, the reference-point identification unit 52 counts the number of pixels which contact with the object area, for each of the top, bottom, left, and right ends of the image. Then, the reference-point identification unit 52 identifies the image end having the largest number of pixels which are in contact with the object area. It is assumed that the wrist is positioned near the image end. For example, in the case of the image 300 presented in FIG. 3, the bottom image end is identified as the image end including a part around the wrist.

Subsequently, the reference-point identification unit 52 counts the number of pixels included in the object area for each pixel row parallel to the image end whose part which is in contact with the object area is largest in length. Then, the reference-point identification unit 52 calculates the difference in number of pixels included in the object area between each two adjacent pixel rows, sequentially from the above image end according to the following equation.

$$\Delta_j = c_{j+1} - c_j \quad (1)$$

In the above equation, $c_j$ and $c_{j+1}$ represent the numbers of pixels included in the object area in the j-th and (j+1)-th pixel rows (where j is an integer larger than or equal to 0) from the image end, respectively. Moreover, $\Delta_j$ represents the difference in the number of pixels included in the object area between the (j+1)-th pixel row and the j-th pixel row from the image end.

The reference-point identification unit 52 compares the difference $\Delta_j$ in number of pixels included in the object area between adjacent pixel rows, with a threshold value Th, sequentially from the image end. Then, the reference-point identification unit 52 determines that the wrist is locating at the pixel row j when the difference $\Delta_j$ is larger than the threshold value Th at first. The reference-point identification unit 52 then determines the center of the object area in the pixel row j to be the reference point.

In one or more embodiments of the present invention, the threshold value Th is set at the value corresponding to the amount of change in width of the object area between the wrist and the palm, for example, 2 to 3.

The reference-point identification unit 52 notifies the moving-part position detection unit 53 of the image end which is in contact with the object area and the coordinates of the reference point.

Every time the processing unit 5 receives an image from the imaging unit 10, the moving-part position detection unit 53 obtains the position of the moving part in the area on the moving-part side of the reference point in the object area, in the object area image corresponding to the received image. In one or more embodiments of the present invention, the moving part is a part of the hand from the wrist to the tip, i.e., the palm and the fingers. Accordingly, the moving-part position detection unit 53 determines the pixel row at which the reference point is locating and which is parallel to the image end whose part which is in contact with the object area is largest in length, as the detection boundary for obtaining the position of the moving part. Then, the moving-part position detection unit 53 divides the area on the moving-part side of the detection boundary (referred to as a moving area below, for convenience) into a plurality of areas along the moving direction of the moving part at the time of performing the motion to be detected. In one or more embodiments of the present invention, since the motion to be detected is the motion of swinging a hand, the moving part moves in the direction substantially orthogonal to the vertical direction of the hand, i.e., the direction from the wrist to the fingertips. Moreover, due to the structure of hands, the vertical direction of the hand intersects with the direction parallel to the image end whose part which is in contact with the object area is largest in length. Accordingly, the moving-part position detection unit 53 divides the moving area into a plurality of partial areas along the direction parallel to the image end whose part which is in contact with the object area is largest in length. According to one or more embodiments of the present invention, the width of each of the areas divided is set so that each area includes part of the moving part and the width of each area is smaller than the maximum width of the moving part. With this configuration, when the moving part has moved, the partial areas including the moving part change before and after the move, which makes it easier to detect the move of the moving part.

Figure 4A:
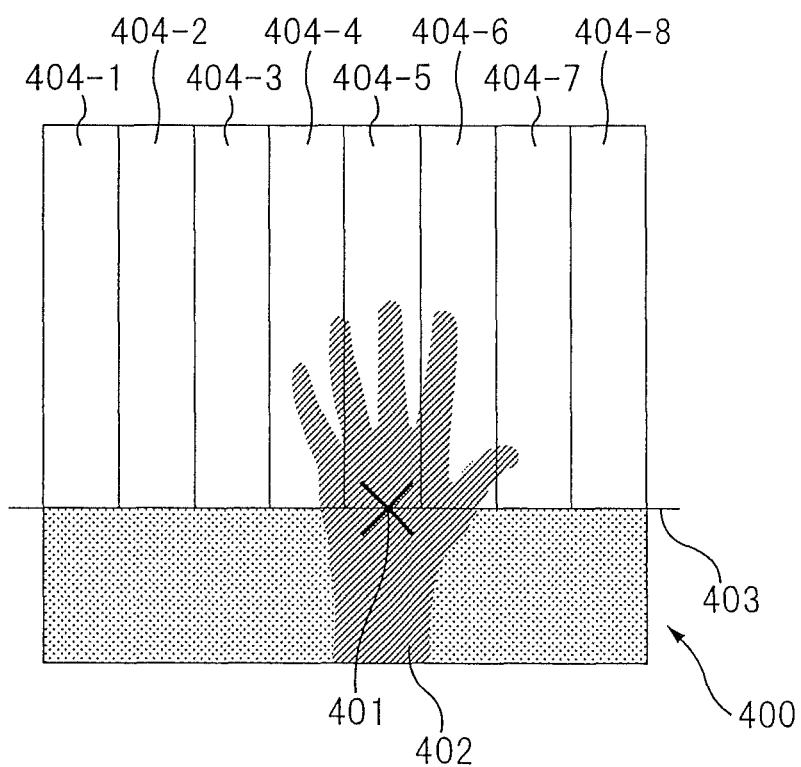
FIG. 4A is a diagram illustrating the positional relationship between a detection boundary and partial areas when an object area is in contact with the bottom end of an image.
Figure 4B:
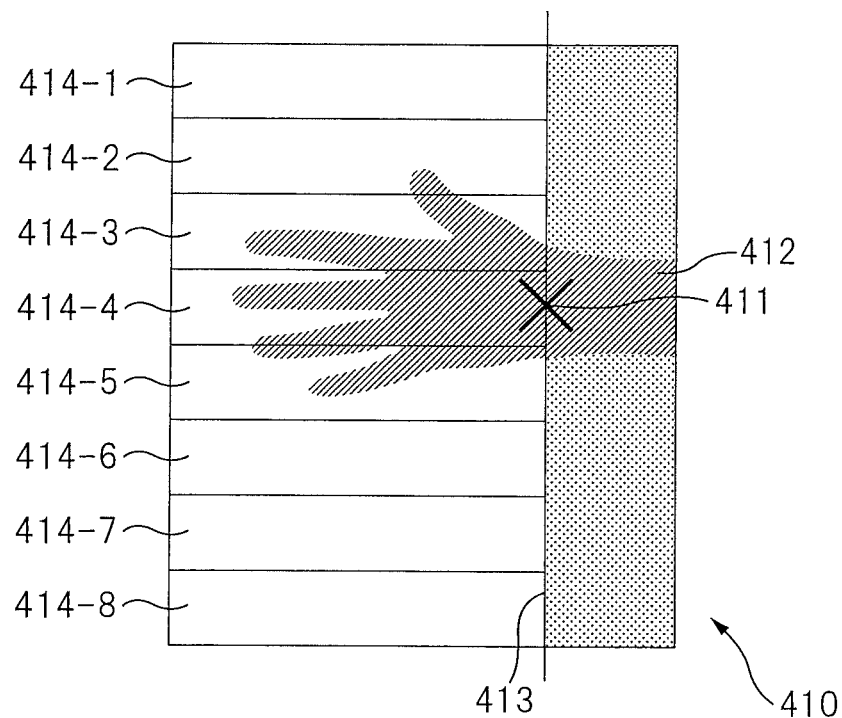
FIG. 4B is a diagram illustrating the positional relationship between a detection boundary and partial areas when an object area is in contact with the right end of an image.

FIG. 4A is a view illustrating the positional relationship between a detection boundary and partial areas when an object area is in contact with the bottom end of an object area image. FIG. 4B is a view illustrating the positional relationship between a detection boundary and partial areas when an object area is in contact with the right end of an object area image. In FIG. 4A, a point 401 in an object area image 400 is a reference point. In this example, since an object area 402 is in contact with the bottom end of the object area image 400, a detection boundary 403 is set to pass the reference point 401 and to be parallel to the bottom end of the object area image 400. Moreover, the moving area, which is above the detection boundary 403, is divided into eight partial areas 404-1 to 404-8 in the lateral direction. Similarly, in FIG. 4B, a point 411 in an object area image 410 is a reference point. In this example, since an object area 412 is in contact with the right end of the object area image 410, a detection boundary 413 is set to pass the reference point 411 and to be parallel to the right end of the object area image 410. Moreover, the moving area, which is on the left of the detection boundary 413, is divided into eight partial areas 414-1 to 414-8 in the vertical direction.

The moving-part position detection unit 53 counts, for each partial area, the number of pixels included in the object area and included in the partial area.

The moving-part position detection unit 53 compares, for each partial area, the number of pixels included in the object area and included in the partial area, with a predetermined threshold value Th2. When the number of pixels is larger than the threshold value Th2, the moving-part position detection unit 53 determines that the moving part of the detection-target object is included in the partial area. The threshold value Th2 is set, for example, at the value obtained by multiplying the total number of pixels included in the partial area by 0.2 to 0.3.

The moving-part position detection unit 53 determines the center of the partial areas determined that the moving part of the detection-target object is included, as the position of the moving part, and then notifies the determination unit 54 of the identification number of the partial area including the center.

The determination unit 54 determines whether or not the difference between the position of the moving part in the newest image and the position of the moving part in a past image corresponds to the movement of the detection-target object during the certain motion, and determines, when the difference corresponds to the movement, that the detection-target object has performed the certain motion.

In one or more embodiments of the present invention, the determination unit 54 checks the transition of partial areas determined that the detection-target object is included.

Figure 5A:
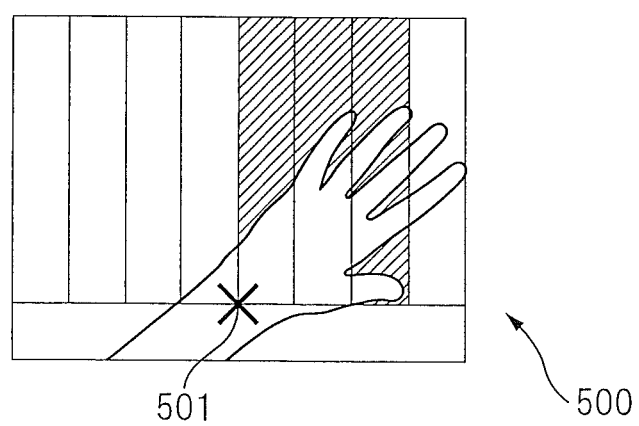
FIG. 5A is a view illustrating an example of the relationship between a motion of moving a hand, which is a detection-target object, from right to left and transition of partial areas in which the hand is detected.
Figure 5B:
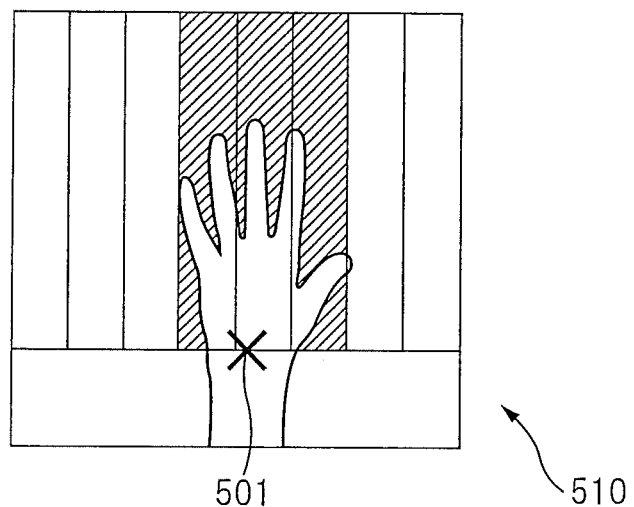
FIG. 5B is a view illustrating the example of the relationship between the motion of moving a hand, which is the detection-target object, from right to left and the transition of the partial areas at which the hand is detected.
Figure 5C:
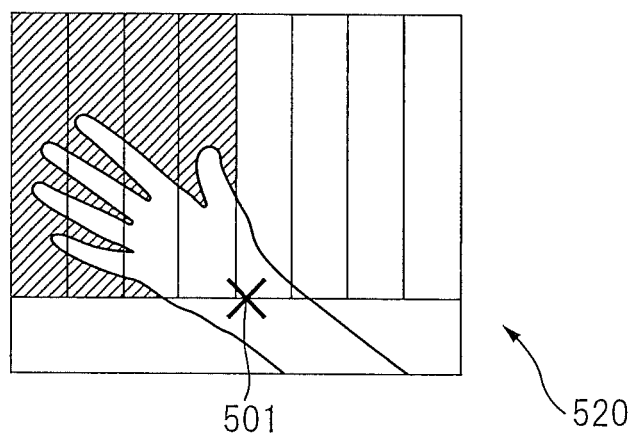
FIG. 5C is a view illustrating the example of the relationship between the motion of moving a hand, which is the detection-target object, from right to left and the transition of the partial areas at which the hand is detected.

FIGS. 5A to 5C illustrate an example of the relationship between the motion of swinging the hand, which is the detection-target object, from right to left and the transition of partial areas in which the hand is detected. In FIGS. 5A to 5C, the moving area is divided into eight partial areas in the lateral direction. In this example, it is assumed that an image 500 illustrated in FIG. 5A is captured first, and then an image 510 illustrated in FIG. 5B and an image 520 illustrated in FIG. 5C are sequentially captured.

As illustrated in FIG. 5A, the hand is positioned on the right of the wrist in the image 500 captured first. Accordingly, the hand is included in partial areas positioned on the right of a reference point 501. As illustrated in FIG. 5B, in the image 510 captured after the image 500, the hand is positioned straight, and hence the hand is included in partial areas positioned near the reference point 501. Subsequently, the hand is moved to the left of the wrist in the image 520 as illustrated in FIG. 5C, and hence the hand is included in partial areas positioned on the left of the reference point 501.

As described above, in the motion of swinging the hand, the partial areas including the hand move over the reference point along the moving direction of the hand at the time of swinging the hand, with the passage of time. In view of this, in the case where the image end which is in contact with the object area is the top end or the bottom end, the determination unit 54 determines that the motion of swinging a hand has been performed, when the center of the partial areas including the hand moves from the right of the reference point to the left of the reference point or when the center moves from the left of the reference point to the right of the reference point. Similarly, in the case where the image end which is in contact with the object area is the right end or the left end, the determination unit 54 determines that the motion of swinging a hand has been performed, when the center of the partial areas including the hand moves from above the reference point to below the reference point or when the center moves from below the reference point to above the reference point.

Figure 6:
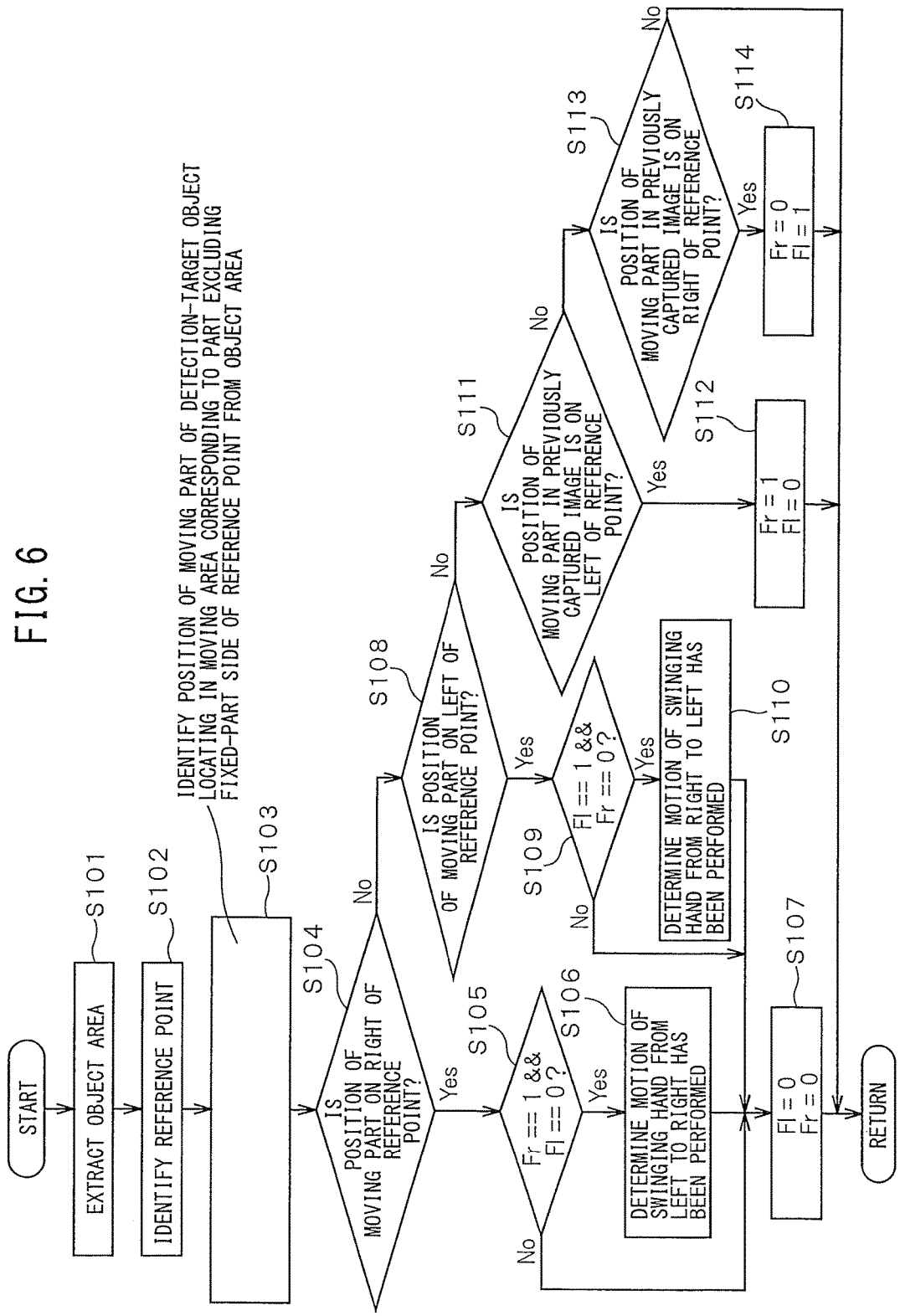
FIG. 6 is an operation flowchart of an object-motion detection process performed by the processing unit.

FIG. 6 is an operation flowchart of an object-motion detection process performed by the processing unit 5. Every time receiving an image from the imaging unit 10, the processing unit 5 determines whether or not the motion of swinging a hand has been performed, according to the operation flowchart to be described below. It is assumed, in the operation flowchart in FIG. 6, that an object area is in contact with the bottom end or the top end of each image, and the processing unit 5 detects the motion of swinging a hand from left to right or the motion of swinging a hand from right to left. An operation flowchart of detecting, by the processing unit 5 when the object area is in contact with the left end or the right end of each image, the motion of swinging a hand from above to below on the image or the motion of swinging a hand from below to above on the image is obtained by replacing "left" with "above," "right" with "below" and "lateral direction" with "vertical direction," in the operation flowchart to be described below.

First, the object-area extraction unit 51 extracts an object area including a detection-target object from an image received from the imaging unit 10 (Step S101). Then, the reference-point identification unit 52 identifies a reference point indicating the boundary between a moving part and a fixed part, on the basis of the object area (Step S102). Then, the moving-part position detection unit 53 identifies the position of the moving part of the detection-target object positioned in a moving area corresponding to the part excluding the fixed-part side of the reference point from the object area (Step S103).

The determination unit 54 determines whether or not the position of the moving part is on the right of the reference point (Step S104).

When the position of the moving part is on the right of the reference point (Yes in Step S104), the determination unit 54 determines whether or not a right-direction moving flag Fr read out from the storage unit 4 is set at "1", which is the value indicating that the moving part started to move from the left of the reference point, and a left-direction moving flag Fl read out from the storage unit 4 is set at "0", which is the value indicating that the moving part did not start to move from the right of the reference point (Step S105).

When the right-direction moving flag Fr is set at "1" and the left-direction moving flag Fl is set at "0", i.e., when the moving part started to move from the left of the reference point, the determination unit 54 determines that the motion of swinging a hand from left to right has been performed (Step S106). After Step S106, or when it is determined in Step S105 that the right-direction moving flag Fr is set at "0" and the left-direction moving flag Fl is set at "1," the determination unit 54 sets both the right-direction moving flag Fr or the left-direction moving flag Fl at "0" (Step S107).

On the other hand, when it is determined in Step S104 that the position of the moving part is not on the right of the reference point (No in Step S104), the determination unit 54 determines whether or not the position of the moving part is on the left of the reference point (Step S108).

When the position of the moving part is on the left of the reference point (Yes in Step S108), the determination unit 54 determines whether or not the right-direction moving flag Fr is set at "0" and the left-direction moving flag Fl is set at "1", i.e., whether or not the moving part started to move from the right of the reference point (Step S109).

When the right-direction moving flag Fr is set at "0" and the left-direction moving flag Fl is set at "1," i.e., when the moving part started to move from the right of the reference point, the determination unit 54 determines that the motion of swinging a hand from right to left has been performed (Step S110). After Step S110, or when it is determined in Step S109 that the right-direction moving flag Fr is set at "1" or the left-direction moving flag Fl is set at "0," the determination unit 54 sets both the right-direction moving flag Fr and the left-direction moving flag Fl at "0" (Step S107).

When it is determined in Step S108 that the position of the moving part is not on the left of the reference point (No in Step S108), i.e., when the lateral position of the moving part is substantially equal to the lateral position of the reference point, the determination unit 54 determines whether or not the position of the moving part in the image captured previously is on the left of the reference point (Step S111). When the position of the moving part in the image captured previously is on the left of the reference point (Yes in Step S111), the determination unit 54 determines that the moving part started to move from the left of the reference point, and sets the right-direction moving flag Fr at "1" while setting the left-direction moving flag Fl at "0" (Step S112).

On the other hand, when the position of the moving part in the image captured previously is not on the left of the reference point (No in Step S111), the determination unit 54 determines whether or not the position of the moving part in the image captured previously is on the right of the reference point (Step S113). When the position of the moving part in the image captured previously is on the right of the reference point (Yes in Step S113), the determination unit 54 determines that the moving part started to move from the right of the reference point, and sets the right-direction moving flag Fr at "0" while setting the left-direction moving flag Fl at "1" (Step S114). On the other hand, when the position of the moving part in the image captured previously is not on the right of the reference point (No in Step S113), i.e., when the lateral position of the moving part in the image captured previously is substantially equal to the lateral position of the reference point, the determination unit 54 does not update any of the right-direction moving flag Fr and the left-direction moving flag Fl.

After Step S107, S112, or S114, the determination unit 54 stores the right-direction moving flag Fr and the left-direction moving flag Fl in the storage unit 4. Thereafter, the processing unit 5 terminates the object-motion detection process.

In the case where the time to be used for performing the motion of swinging a hand once is shorter than a capturing interval of the imaging unit 10, the determination unit 54 may determine that the motion of swinging a hand has been performed, when detecting that the moving part is positioned on the left (or right) of the reference point and thereafter detecting the moving part is positioned on the right (or left) of the reference point, without checking whether the lateral position of the moving part and the lateral position of the reference point are substantially the same as in the above-described operation flowchart.

As described above, this motion sensor determines whether or not a motion to be detected has been performed by an object, by identifying the position of the object while excluding an area of each image which includes the part of the object not moving much during the motion. Consequently, this motion sensor can detect the motion of the object even when the part of the object not moving much is included in the images.

According to a modified example, the reference-point identification unit 52 may identify a reference point for one of a plurality of images received from the imaging unit 10 and then apply the reference point to the other images. This is possible because the position of the reference point is assumed not to change much during the certain motion.

Moreover, according to another modified example, the moving-part position detection unit 53 may obtain, as the position of the moving part, the center of the part included in the moving area in the object area, without setting any partial areas in the moving area. According to still another modified example, when the moving-part position detection unit 53 obtains, as the position of the moving part, the center of the part included in the moving area in the object area, the determination unit 54 may calculate the distance from the position of the moving part in an image captured at a certain time point to the position of the moving part in each of images captured in a predetermined time period after the certain time point. The determination unit 54 may determine that the motion of swinging a hand has been performed, when the distance is larger than or equal to a distance threshold value corresponding to the motion of swinging a hand.

Moreover, the motion to be detected is not limited to the motion of swinging a hand. According to a modified example, the motion sensor 1 may detect the motion of making a first or the motion of opening a hand. In this case, the moving-part position detection unit 53 may obtain the distance from the position of a wrist, where the reference point is positioned, to each pixel on the boundary of an object area positioned on the moving-area side, and determine the position of the pixel having the largest distance, i.e., the tip of the moving part, as the position of the moving part. Then, the determination unit 54 may determine that the motion of making a first or the motion of opening a hand has been performed, when the distance between the position of the tip of the moving part in the image captured at a certain time point and the position of the tip of the moving part in an image captured after the certain time point is larger than or equal to a threshold value corresponding to the difference between the positions of the fingertip when a first is made and when a hand is opened.

Moreover, the detection-target object is not limited to a hand. For example, the detection-target object may be one of the fingers. In addition, the motion to be detected may be the motion of bending the finger or the motion of stretching out the finger. In this case, the reference-point identification unit 52 identifies, as a reference point, the position including the base of the finger in each image. For example, the reference-point identification unit 52 obtains, from the image end opposite to the image end which is in contact with the object area, the number of object areas which are divided by the background area and are positioned on a pixel row parallel to the image end which is in contact with the object area. It may be determined that the base of the finger is included in the first pixel row at which the number of object areas is decreased after the number of object areas increased to two or more once.

According to still another modified example, images generated by the imaging unit 10 may be color images. In this case, the object-area extraction unit 51 may extract, for example, as an object area, a group of pixels having color corresponding to a detection-target object, from each image. When the detection-target object is a human hand as described above, the object-area extraction unit 51, for example, converts the color space as needed, to represent each pixel in each image by using the HSV color system. Then, the object-area extraction unit 51 may extract, as an object area, a group of pixels included in the range of hue values corresponding to skin color, for example, 0° to 30°.

Figure 7:
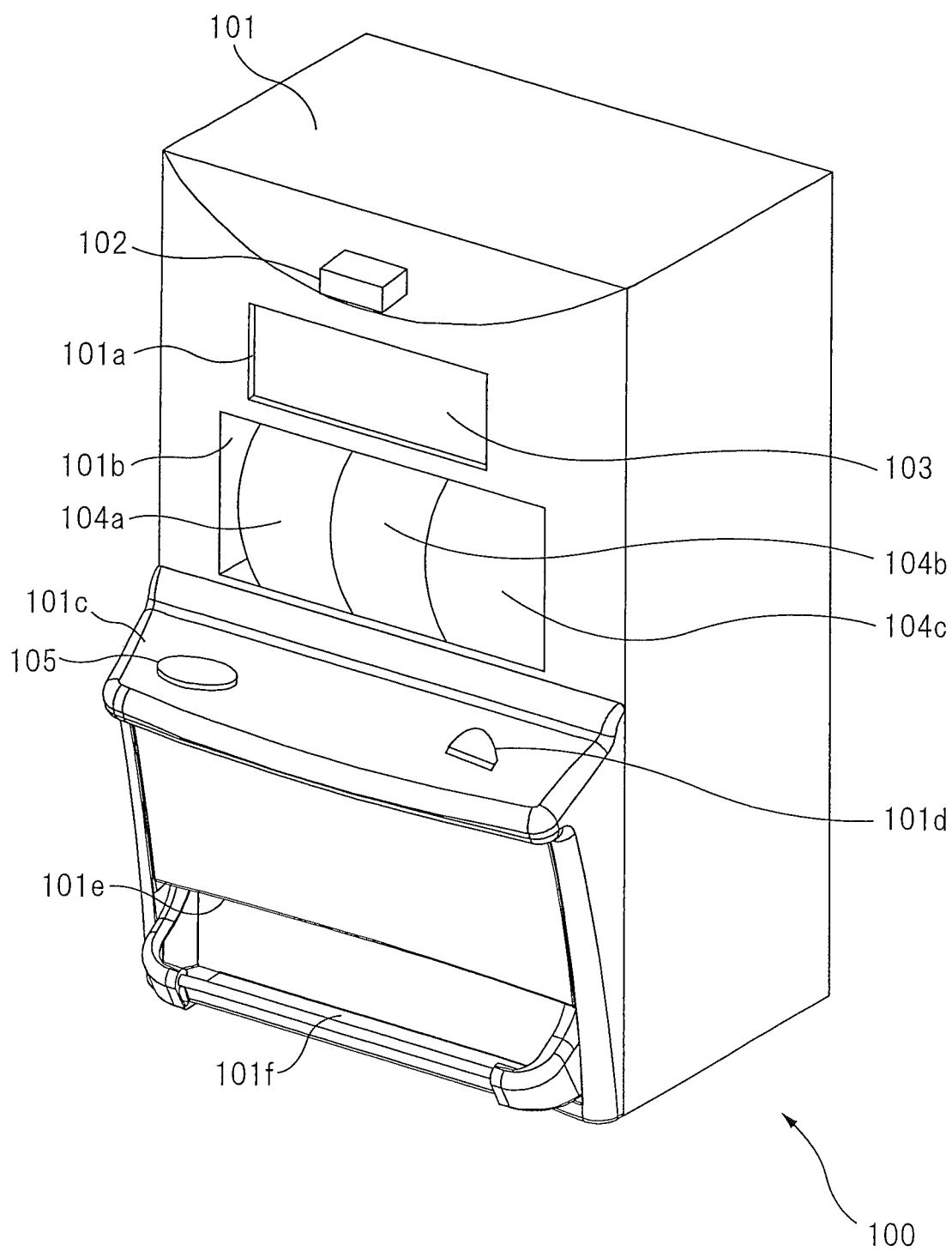
FIG. 7 is a perspective view schematically illustrating a slot game machine including the motion sensor according to one or more embodiments of the present invention, as well as modified examples.
Figure 8:
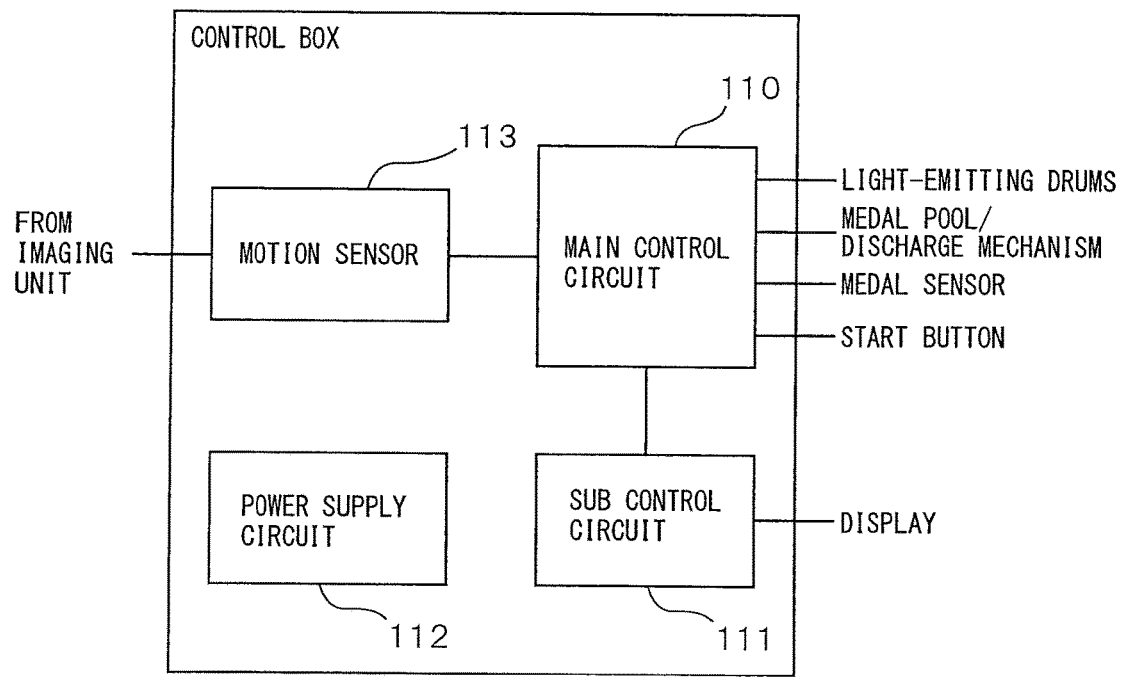
FIG. 8 is a block diagram illustrating circuitry of the slot game machine.

FIG. 7 is a perspective view schematically illustrating a slot game machine 100 including the motion sensor according to one or more embodiments of the present invention, as well as modified examples. FIG. 8 is a block diagram illustrating circuitry of the slot game machine 100. As illustrated in FIG. 7, the slot game machine 100 includes a main-body casing 101, which is the game machine main body, an imaging unit 102, a display 103, light-emitting drums 104a to 104c, and a start button 105.

In addition, the slot game machine 100 includes, in the main body casing 101, a control box (not illustrated) for accommodating various control circuits, a medal sensor (not illustrated) for detecting inserted medals, and a medal pool/discharge mechanism (not illustrated) for temporarily pooling medals and then discharging medals according to a control signal from a main control circuit 110.

In addition, as illustrated in FIG. 8, the control box accommodates, for example, the main control circuit 110 for controlling the entire slot game machine 100, a sub control circuit 111 for controlling the units related to presentation of a game, such as the display 103 and a speaker (not illustrated), a power supply circuit 112 for supplying power to the units of the slot game machine 100, and a motion sensor 113 according to one or more embodiments of the present invention, as well as modified examples.

On the upper part of the front face of the main body casing 101, an imaging unit 102 is disposed to direct downward so that the imaging unit 102 can capture images of a predetermined capturing range on the front face of the main body housing 101. The imaging unit 102 is implemented by an infrared camera, for example. The imaging unit 102 may further include a lighting source such as infrared-emitting diodes for lighting the capturing range. When the imaging unit 102 receives an instruction from the main control circuit 110 to start capturing images, the imaging unit 102 generates images of the capturing range captured at predetermined capturing intervals. In this example, images are generated so that one end of the capturing range that is closest to the main body casing 101 would correspond to the top end of each image while the other end of the capturing range that is furthest away from the main body housing 101 would correspond to the bottom end of each image. The images generated by the imaging unit 102 are sequentially transmitted to the motion sensor 113.

In a part on the front face of the main body casing 101 under the imaging unit 102, an opening 101a is formed, and the display screen of the display 103 can be viewed through the opening 101a. In addition, in a substantially central part of the front face of the main body casing 101 under the opening 101a, an opening 101b is formed, and the light-emitting drums 104a to 104c can be viewed through the opening 101b. On the upper face of a frame 101c under the opening 101b, a medal slot 101d for inserting medals is formed.

In a lower part of the front face of the main body casing 101, a medal discharge opening 101e for discharging medals is formed. Under the medal discharge opening 101e, a medal receiving tray 101f for preventing the discharged medals from falling is attached. In addition, speakers (not illustrated) may be attached to the parts near the upper left end and upper right end of the front face of the main body casing 101.

The light-emitting drums 104a to 104c are configured to be individually rotatable around a rotation axis (not illustrated) which is substantially parallel to the front face of the main body casing 101 and substantially horizontal, according to a control signal from the main control circuit 110. The surface of each of the light-emitting drums 104a to 104c is divided into a plurality of regions in the rotation direction, the regions having substantially the same width, and various patterns are printed on the respective regions. Alternatively, a display such as a liquid crystal display may be provided so that the display screen can be viewed through the opening 101b, instead of the light-emitting drums 104a to 104c. In this case, the display displays an image presenting a plurality of simulated drums, according to a control signal from the main control circuit 110.

The start button 105 is provided on the left with respect to the front face of the frame 101c on the front face of the main body casing 101. When a medal is inserted into the medal slot 101d, the medal sensor (not illustrated) detects the inserted medal, and then outputs the detection result to the main control circuit 110. Thereafter, the main control circuit 110 determines the number of games to play according to the inserted medal, and then allows the slot game machine 100 to start the games. Subsequently, upon operation of the start button 105, a signal indicating that the start button 105 has been operated is transmitted to the main control circuit 110. Then, the main control circuit 110 starts the rotation of the light-emitting drums 104a to 104c.

Moreover, the main control circuit 110 notifies the imaging unit 102 of a control signal instructing the imaging unit 102 to start capturing images, and also transmits, to the motion sensor 113, a control signal instructing the motion sensor 113 to start detecting a certain motion of a game player.

Furthermore, the main control circuit 110 notifies the sub control circuit 111 of a control signal instructing the sub control circuit 111 to start presentation associated with the start of rotation of the light-emitting drums 104a to 104c. When the sub control circuit 111 receives the control signal, the sub control circuit 111 causes the display 103 to display a guidance message for causing the game player to perform the certain motion.

Figure 9:
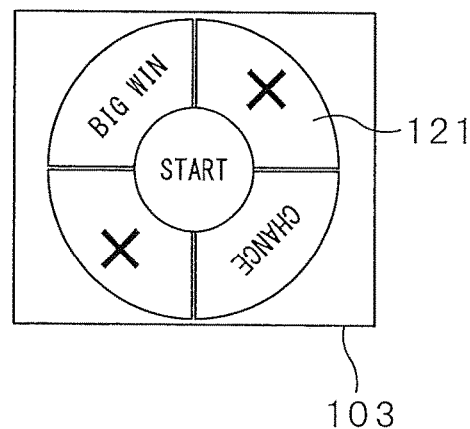
FIG. 9 is a view illustrating an example of presentation screen displayed by a display.

For example, as illustrated in FIG. 9, when the presentation is that a game player stops a roulette 121 displayed on the screen of the display 103 by performing motion of swinging his/her hand from far (i.e., the side close to the main body casing 101) to near (i.e., the side away from the main body casing 101), the sub control circuit 111 causes the display 103 to display the message of "When the roulette starts to rotate, move your hand from screen side to your side!" for a certain period (e.g., three seconds). Then, the sub control circuit 111 causes the display 103 to display a video of the rotating roulette for a predetermined input period (e.g., one minute). When the game player performs the specified motion (the motion of swinging his/her hand from the far to near in this example) in the capturing range of the imaging unit 102, the motion sensor 113 detects that the motion has been performed, on the basis of the images from the imaging unit 102.

Figure 10:
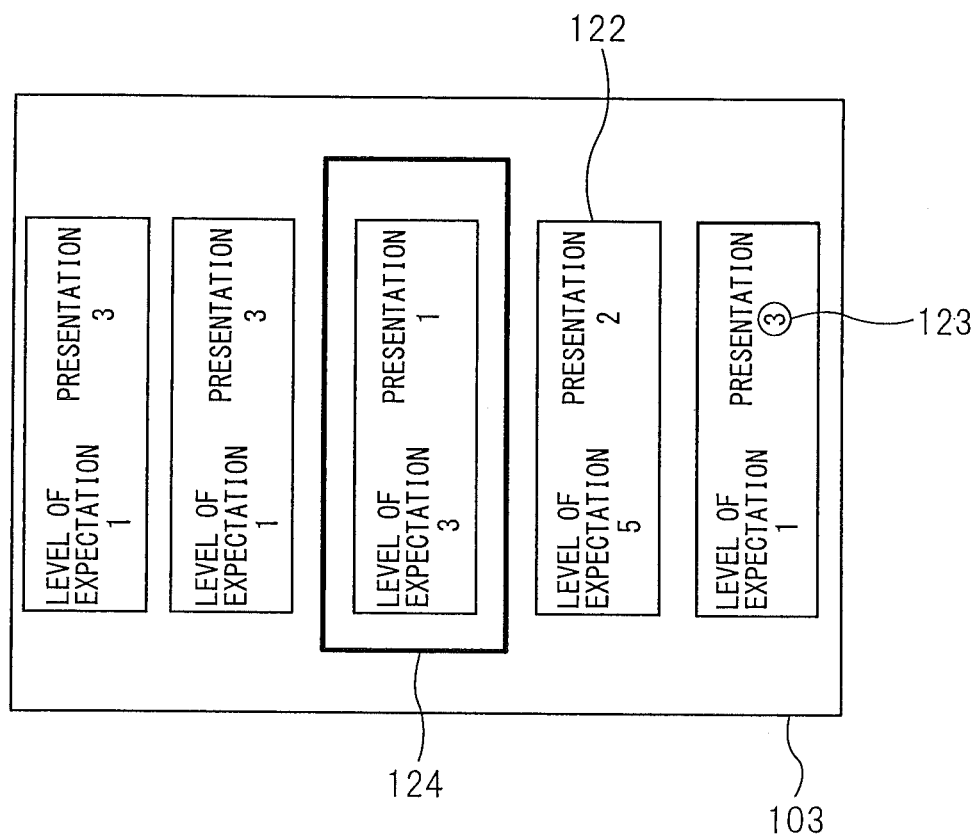
FIG. 10 is a view illustrating another example of the presentation screen displayed by the display.

Alternatively, the presentation may be such that a plurality of blocks 122 each indicating a type of presentation at the time of a big win move from left to right in the screen of the display 103, as illustrated in FIG. 10. In this case, the certain motion may be swinging a hand from right to left, for example. In this case, the sub control circuit 111 causes the display 103 to display the message of "Move your hand from right to left!" for a certain period (e.g., three seconds), for example. Thereafter, the sub control circuit 111 causes the display 103 to display a video of a plurality of horizontally-aligned blocks moving from left to right, for a predetermined input period (e.g., one minute), as illustrated in FIG. 10. Each block presents, for example, level 1, 2, or 3 indicating how advantageous the presentation is. When the game player performs the specified motion (the motion of swinging his/her hand from left to right in this example) in the capturing range of the imaging unit 102 during the input period, the motion sensor 113 detects that the motion has been performed, on the basis of the images from the imaging unit 102.

When the motion sensor 113 detects that the specified motion has been performed, the motion sensor 113 notifies the main control circuit 110 of a detection signal indicating the information. Then, the main control circuit 110 performs control of a lottery with regard to whether or not a big win is to be made, according to the timing of receiving the detection signal and the state of the light-emitting drums 104a to 104c at the timing. When the motion sensor 113 does not detect in the input period that the specified motion has been performed, the main control circuit 110 performs lottery control at the timing when the input period ends, instead of the timing of receiving a detection signal.

Alternatively, the main control circuit 110 determines the presentation at the time of a big win, according to the timing of receiving the detection signal and the level of presentation indicated on the block displayed at a predetermined position of the display 103 at the timing (e.g., in a central frame 124 presented in FIG. 10).

The main control circuit 110 determines the timing of stopping the light-emitting drums 104a to 104c, according to the result of the lottery control, and stops the light-emitting drums 104a to 104c at the timing. Moreover, the main control circuit 110 determines the number of medals to be paid out, according to the result of the lottery control, and controls the medal pool/discharge mechanism so that the determined number of medals would be paid out. Furthermore, the main control circuit 110 notifies the sub control circuit 111 of the result of the lottery control.

Alternatively, the main control circuit 110 notifies the sub control circuit 111 of a control signal corresponding to the determined presentation.

The sub control circuit 111 determines an image to be displayed by the display 103, according to the result of the lottery control. Alternatively, the sub control circuit 111 reads video data corresponding to a control signal according to the determined presentation, from a memory (not illustrated) included in the sub control circuit 111. Then, the sub control circuit 111 causes the display 103 to display the video.

As described above, it is possible for those skilled in the art to make various changes according to the modes to be carried out, within the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motion sensor comprising:
a processor configured to:
  extract, from each of a first image representing a detection target object and generated by a camera and a second image representing the detection-target object and generated after the first image by the camera, an object area including the detection-target object;
  detect, from each of the first image and the second image, a reference point indicating a boundary between a moving part of the detection-target object and a fixed part of the detection-target object, the moving part moving when the detection-target object performs a certain motion, the fixed part not moving compared to the moving part when the detection-target object performs the certain motion;

set a first area located on a side including the moving part with respect to the reference point;

obtain, for each of the first image and the second image, a position of the moving part of the object area in the first area; and determine that the certain motion has been performed, when a difference between the position of the moving part in the first image and the position of the moving part in the second image corresponds to a movement of the detection-target object during the certain motion, wherein detection of the reference point includes calculating, for each pixel line parallel to an end of the first image with which the object area is in contact, a width of the object area at the pixel line and detecting the reference point on the first image based on a variation of the width of the object area along a direction across the end of the first image.

2. The motion sensor according to claim 1, wherein the processor is further configured to divide the first area into a plurality of partial areas along a direction in which the moving part moves when the detection-target object performs the certain motion, and wherein obtaining the position of the moving part includes determining a center of one or more of the plurality of partial areas which overlap with the object area as the position of the moving part.

3. The motion sensor according to claim 2, wherein the processor determines that the certain motion has been performed, when the reference point is locating between the position of the moving part in the first image and the position of the moving part in the second image along the direction in which the detection-target object moves during the certain motion.

4. The motion sensor according to claim 1, wherein the processor determines that the certain motion has been performed, when the reference point is locating between the position of the moving part in the first image and the position of the moving part in the second image along the direction in which the detection-target object moves during the certain motion.

5. An object-motion detection method comprising:

extracting, from each of a first image representing a detection-target object and generated by a camera and a second image representing the detection-target object and generated after the first image by the camera, an object area including the detection-target object;

detecting, from each of the first image and the second image, a reference point indicating a boundary between a moving part of the detection-target object and a fixed part of the detection-target object, the moving part moving when the detection-target object performs a certain motion, the fixed part not moving compared to the moving part when the detection-target object performs the certain motion;

setting a first area located on a side including the moving part with respect to the reference point;

obtaining, for each of the first image and the second image, a position of the moving part of the object area in the first area; and determining that the certain motion has been performed, when a difference between the position of the moving part in the first image and the position of the moving part in the second image corresponds to a movement of the detection-target object during the certain motion, wherein detection of the reference point includes calculating, for each pixel line parallel to an end of the first image with which the object area is in contact, a width of the object area at the pixel line and detecting the reference point on the first image based on a variation of the width of the object area along a direction across the end of the first image.

6. A game machine comprising:

a game machine main body;

a camera that captures images of a certain range on a front face of the game machine main body at predetermined capturing intervals, and generates an image including the certain range every time capturing;

a motion sensor that detects a certain motion of a detection-target object locating in the certain range, by using the images;

a controller that determines a content of presentation according to timing of detecting the certain motion of the detection-target object; and a display that displays an image corresponding to the content of presentation, wherein the motion sensor comprises:

a processor configured to:

extract, from each of a first image representing the detection-target object and generated by the camera and a second image representing the detection-target object and generated after the first image by the camera, the first image including the detection-target object, an object area including the detection-target object;

detect, from each of the first image and the second image, a reference point indicating a boundary between a moving part of the detection-target object and a fixed part of the detection-target object, the moving part moving when the detection-target object performs the certain motion, the fixed part not moving compared to the moving part when the detection-target object performs the certain motion;

set a first area located on a side including the moving part with respect to the reference point;

obtain, for each of the first image and the second image, position of the moving part of the object area in the first area; and determine that the certain motion has been performed, when difference between the position of the moving part in the first image and the position of the moving part in the second image corresponds to a movement of the detection-target object during the certain motion, wherein detection of the reference point includes calculating, for each pixel line parallel to an end of the first image with which the object area is in contact, a width of the object area at the pixel line and detecting the reference point on the first image based on a variation of the width of the object area along a direction across the end of the first image.

* * * * *